C. A. FANKHAUSER.
PROCESS AND MACHINE FOR COATING BONBONS AND THE LIKE.
APPLICATION FILED JAN. 13, 1921.
1,424,286.                                                          Patented Aug. 1, 1922.
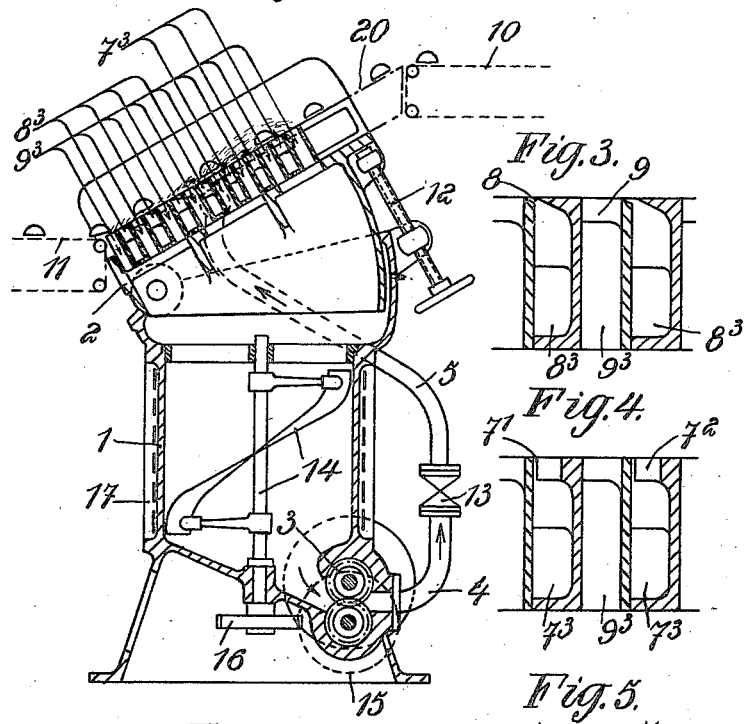
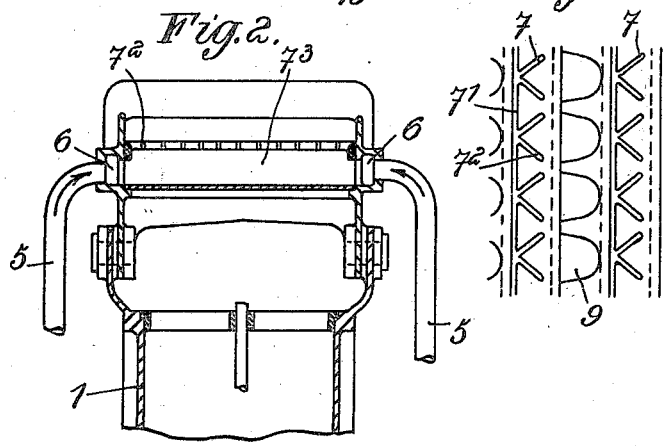
Inventor:
Charles Auguste Fankhauser
By Lawrence Langner
Attorney.

UNITED STATES PATENT OFFICE.

CHARLES AUGUSTE FANKHAUSER, OF GENEVA, SWITZERLAND.

PROCESS AND MACHINE FOR COATING BONBONS AND THE LIKE.

1,424,286.   Specification of Letters Patent.   Patented Aug. 1, 1922.

Application filed January 13, 1921. Serial No. 437,019.

*To all whom it may concern:*

Be it known that I, CHARLES AUGUSTE FANKHAUSER, engineer, a citizen of Switzerland, residing at Geneva, Canton of Geneva, in the Confederation of Switzerland, have invented certain new and useful Improvements in Processes and Machines for Coating Bonbons and the like, of which the following is a specification.

According to the methods heretofore known and practised for coating sweetmeats of fruit-sugar and the like, the sweetmeats to be coated were disposed upon a horizontal endless sieve apron and conveyed across a jet of liquid chocolate whereby these sweetmeats were coated by liquid chocolate coming from above.

This method has two drawbacks:

First the bottom side of the sweetmeats, that is to say that part with which they rest upon the endless apron, does not get a regular coating and second the endless apron, which in most cases is a conveyer band carried on pulleys, becomes easily and soon defective.

These drawbacks are avoided by the method according to this invention in the way that liquid chocolate is made to emerge from below through openings in a rigid slanting plane, thereby forming a chocolate stream flowing downwards, the sweetmeats to be coated being brought on the top end of the slanting plane and caused to glide down on it within the chocolate stream, so as to become covered and coated all over with chocolate.

The machine for carrying out this method has a slanting table plate containing a multiple of apertures and is provided with means for bringing the liquid chocolate from below through said apertures and possesses also means for conveying the sweetmeats to be coated to the top end of said slanting table plate upon which the sweetmeats are to glide down with the liquid chocolate.

The accompanying drawing shows by way of example a working form of such a machine.

Fig. 1 is a vertical longitudinal section,
Fig. 2 a partial vertical cross section and
Figs. 3, 4 and 5 show details on a larger scale.

In this working form the machine is provided with a frame which is made to constitute a reservoir 1 for the liquid chocolate, carrying the horizontal axis around which the one end of the table plate 2 can be made to revolve. The degree of the inclination of the latter is controlled by a screw 12 with a handwheel. Three different kinds of apertures 7, 8, 9 are provided in the table plate 2 of which 7 and 8 permit the exit of the liquid chocolate. The apertures 7 are practically long slits $7^1$ parallel to the revolving axis and extend across the whole width of the table plate 2. At different places additional slits $7^2$ branch off from $7^1$ towards the top. The walls of all these slits are arranged at right angles to the top surface of the table plate. Only the upper half of the table plate is provided with slits 7. In the lower half of said plate apertures 8 are arranged in the form of nozzles and the mouths of which are adapted to direct the liquid chocolate upon its exit from these mouths towards the bottom end of the table plate. These apertures 8 are formed in rows which are equally parallel to the axis upon which the table plate 2 may revolve. Between the apertures 7 and the rows of apertures 8 the openings 9 are arranged for allowing the passage of the excess of chocolate.

The openings 9 are of U shape and the total of their cross section is much greater than that of the apertures 7 or 8 arranged just above them.

The chocolate in the reservoir 1 is heated by means of a heating device 17 to the desired temperature, which then is kept up. A stirring device and a raker or scraper 14 prevent the chocolate from clinging to the walls of the reservoir. The stirring device is driven by the intermediary of a horizontal shaft from a worm and gear drive 15—16.

A gearwheel pump 3 draws the liquid chocolate from the reservoir into the pipe 4. This pipe is connected by means of a valve 13 to two branch pipes 5 which lead into the pressure chambers 6. These latter communicate with the channels $7^3$ and $8^3$ provided in the table plate 2, which lead to the different apertures 7 and 8. The openings 9 are equally connected to channels $9^3$ through which the liquid chocolate is returned to the reservoir 1.

The working manner of this constructional form of the machine is as follows:

The sweetmeats to be coated are by means of an endless apron 10 conveyed near to the top rim of the table plate. They then slide over a plane 20 independent from the latter but having the same inclination as the plate and thereupon reach the slanting table plate 2 upon which they glide downwards. In this course they get into the stream of liquid chocolate emerging from the apertures 7 and rising perceptibly over the plane of the table since the walls of the slits $7^1$, $7^2$ are arranged at right angles to the top plane of the table plate. The sweetmeats are thereby completely covered with the chocolate emerging from below, as shown in Figure 1. They are separated from the plane proper of the table by a layer of liquid chocolate and they glide in and within the chocolate stream down to the bottom end of the table plate. The excess of chocolate is carried off through the respective openings 9 back to the reservoir 1. After having passed three apertures 7 and the rows of openings 9 the sweetmeats get near the apertures 8 from which the liquid chocolate emerges and thereby sweeps the sweetmeats directly towards the bottom end of the table plate. In the course of their travel the bottom sides of the sweetmeats are perfectly coated although the excess of chocolate is being carried away through the openings 9. Another endless apron 11 arranged at the lower end of table plate 2 receives the fully coated sweetmeats and conveys them into a cooling chamber. The cross section of the different openings 7, 8 and 9 are dimensioned in such a manner as to reduce the volume of the chocolate stream in its direction towards the bottom of the table plate.

This arrangement makes sure that the sweetmeats become completely and efficiently coated and even their bottom side which does not come further into contact with the plate owing to the intermediate layer of flowing chocolate receives a real and perfect coating.

By modifying the inclination of the tableplate a variation of the speed of descent of the sweetmeats is realized.

The number of openings or apertures and their arrangement may of course be different from those shown. The heating of the reservoir may be effected by any desired means.

Having now described the nature of my invention and the manner it may be carried out I claim:

1. A machine for coating bonbons and the like comprising a slanting table plate having a plurality of apertures therein, means for bringing liquid coating material underneath said plate and forcing the same through said apertures, whereby a stream of the material will flow down said plate, and means for conveying bonbons and the like to top end of the slanting table plate, so that the bonbons and the like will slide down upon the slanting plate within the stream of coating material.

2. A machine for coating bonbons and the like comprising a slanting table plate having a plurality of apertures therein, means for bringing liquid coating material underneath said plate and forcing the same through said apertures, additional openings in said table plate permitting the excess liquid coating material to escape, whereby a stream of the material will flow down said plate, and means for conveying bonbons and the like to the top end of the slanting table plate, so that the bonbons and the like will slide down upon the slanting plate within the stream of coating material.

3. A machine for coating bonbons and the like comprising a slanting table plate having a plurality of apertures therein, means for bringing liquid coating material underneath said plate and forcing the same through said apertures, additional openings in said table plate permitting the excess liquid coating material to escape, the cross sectional area of the apertures for the incoming material being less than that of the outgoing apertures whereby a stream of the material decreasing in volume will flow down said plate, and means for conveying bonbons and the like to the top end of the slanting table plate, so that the bonbons and the like will slide down upon the slanting plate within the stream of coating material.

4. A machine for coating bonbons and the like comprising a slanting table plate having a plurality of apertures therein, means for regulating the inclination of said plate, means for bringing liquid coating material underneath said plate and forcing the same through said apertures, whereby a stream of the material will flow down said plate, and means for conveying bonbons and the like to the top end of the slanting table plate, so that the bonbons and the like will slide down upon the slanting plate within the stream of coating material.

5. A machine for coating bonbons and the like comprising a slanting table plate having a plurality of apertures therein, means for bringing liquid coating material underneath said plate and forcing the same through said apertures, whereby a stream of the material will flow down said plate, a valve for regulating the volume of the liquid material brought to the table plate, and means for conveying bonbons and the like to the top end of the slanting table plate, so that the bonbons and the like will slide down upon the slanting plate within the stream of coating material.

6. A machine for coating bonbons and the like comprising a slanting table plate having a plurality of apertures therein, means for bringing liquid coating material underneath said plate and forcing the same through said apertures, comprising a pump for circulating the liquid material in a constant stream over the plate, and means for conveying bonbons and the like to the top end of the slanting table plate, so that the bonbons and the like will slide down upon the slanting plate within the stream of coating material.

7. A machine for coating bonbons and the like comprising a slanting table plate having a plurality of apertures therein, a reservoir for liquid coating material below said plate, a heating device for heating the material contained in said reservoir, means for bringing coating material from the reservoir to a point underneath said plate and forcing the same through said apertures, whereby a stream of the material will flow down said plate, and means for conveying bonbons and the like to the top end of the slanting table plate, so that the bonbons and the like will slide down upon the slanting plate within the stream of coating material.

In testimony whereof I have affixed my signature in presence of two witnesses.

CHARLES AUGUSTE FANKHAUSER.

Witnesses:
D'ROD DE WURTEMBERG,
EDM. EMMANUEL.